United States Patent van der Lely

[11] 3,905,498
[45] Sept. 16, 1975

[54] WAGONS HAVING LOADING AND UNLOADING EQUIPMENT

[76] Inventor: Cornelis van der Lely, 7, Bruschenrain, Zug, Switzerland

[22] Filed: June 20, 1974

[21] Appl. No.: 481,315

Related U.S. Application Data

[63] Continuation of Ser. No. 171,131, Aug. 12, 1971, abandoned.

[30] Foreign Application Priority Data

Aug. 13, 1970 Netherlands.................. 7011939

[52] U.S. Cl.................. 214/317; 214/77 R; 214/78; 214/130 R; 214/313; 214/DIG. 5; 298/11
[51] Int. Cl....................... B60p 1/48; B65g 65/36
[58] Field of Search.......... 214/756, 75 H, 77 R, 78, 214/130 R, 131, 313, 315, 317, 318, 392, 515, DIG. 5; 294/2; 298/11

[56] References Cited
UNITED STATES PATENTS

| | | | |
|---|---|---|---|
| 1,411,801 | 4/1922 | Morton | 298/11 |
| 2,211,719 | 8/1940 | Gerosa et al. | 214/317 |
| 2,954,885 | 10/1960 | Sexton | 214/77 R |
| 3,074,573 | 1/1963 | Cole | 214/315 |
| 3,306,646 | 2/1967 | Flora | 294/2 |
| 3,685,673 | 8/1972 | Schweis | 214/77 R |
| 3,685,674 | 8/1972 | Bruer et al. | 214/315 X |
| 3,722,720 | 3/1973 | Sjostrom et al. | 214/317 |

*Primary Examiner*—Robert J. Spar
*Assistant Examiner*—Leslie J. Paperner
*Attorney, Agent, or Firm*—Mason, Mason & Albright

[57] ABSTRACT

The combination of a wagon, loading equipment on one end of the wagon, and a receptacle, container, loading platform, or tool or machine which is lifted on and off the wagon or otherwise supported by the loading equipment. Each such receptacle, etc. has upstanding hoisting beams which straddle the receptacle's center of gravity and are adapted to receive a pair of hydraulically operated grippers included in the loading equipment. The loading equipment has pivotable arms on each side of the wagon which are joined at the top with a beam. The aforesaid grippers depend from a tube rotatably carried by such beam — one on each side, and a further loading device depends from the same tube between the grippers for loading material into or from the receptacle. This further loading device may, in effect, be a tool such as a shovel or a machine such as a harvesting machine. An object lifted by the loading equipment onto the wagon passes between the arms and under the connecting beam and tube. Chains for securing the receptacle to the wagon bed may be used on one end only whereby the receptacle is tipped when lifted by the grippers. A cabin having a seat and controls is optionally pivotably mounted on one side of the wagon, or the controls can be located adjacent a tractor in the forward part of the wagon. The disclosed power means for the lifting equipment is hydraulic. A mechanically driven rolling floor may be utilized in the loading platform.

13 Claims, 11 Drawing Figures

WAGONS HAVING LOADING AND UNLOADING EQUIPMENT

This is a continuation of application Ser. No. 171,131 filed Aug. 12, 1971, now abandoned.

This invention relates to wagons.

According to a first aspect of the present invention there is provided a wagon having loading equipment whereby, with the aid of this loading equipment, a loading platform, a receptacle, a container or the like can be loaded onto the wagon and with the aid of this same loading equipment this loading platform or the like can be loaded while disposed on the wagon.

According to a second aspect of the present invention there is provided a wagon having loading equipment fastened to the wagon on both sides near one end of the wagon.

For a better understanding of the invention and to show how the same may be carried into effect, reference will now be made, by way of example, to the accompanying drawings, in which:

DESCRIPTION OF THE PREFERRED EMBODIMENTS

Figure 1:
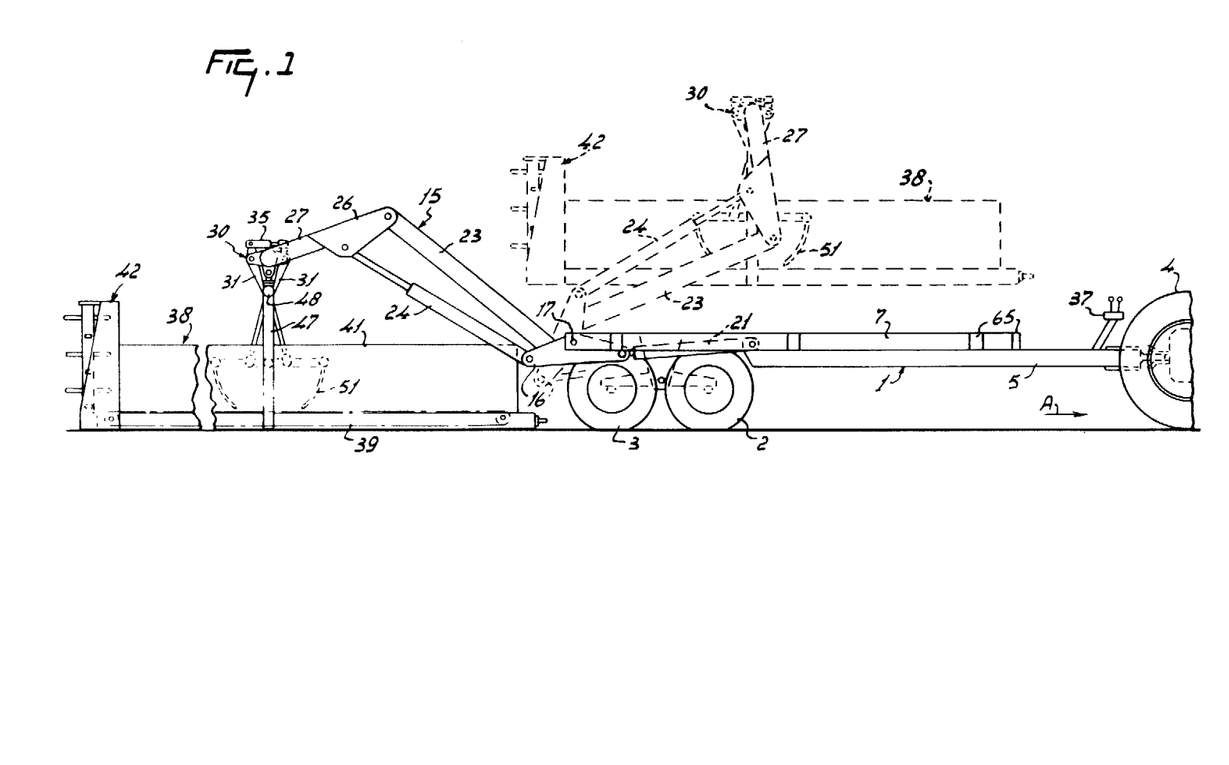
FIG. 1 is a side view of a wagon provided with loading equipment, a manure spreader also being shown in the Figure resting on the ground near the wagon.

The wagon shown in FIG. 1 has a frame 1 supported by ground wheels 2 and 3 for propelling by a tractor 4 but the following description may, of course, also relate to a self-propelled wagon.

The frame 1 includes two beams 5 converging in the intended direction of operative travel A of the wagon (see also FIGS. 5 and 6), interconnected on their top surfaces by a number of transverse beams 6 which are horizontal and extend transverse of the direction of travel A. The transverse beams 6, which are of equal lengths, are bounded at their ends by two longitudinal beams 7, extending in the direction of travel A and extending behind the rear ends of the beams 5. The beams 7 are interconnected at their rear ends by a transverse beam 8. Between and parallel to the beams 7 longitudinal beams 9 are provided. The beams 9 extend from the transverse beam 8 to the rearmost transverse beam 6. The beams 6, 7, 8 and 9 are all located higher than the beams 5. The framework formed by the beams 6, 7, 8 and 9 is covered on the top by a plate 11.

Two upright brackets 12 are secured one to each of the beams 9 so as to depend therefrom. Each bracket 12 supports at its lower end, for pivoting about a shaft 14 passing through its mid-point, an arm 13. The ends of these arms 13 each support on axle shaft 10 common to both arms and having a wheel journalled on each end outboard of the brackets 12 and arms 13. The wagon thus has four wheels mounted on two axles, and is supported by means of jointed cross-shaft axles.

Loading equipment 15 is mounted on the frame near one end of the wagon. In this case the loading equipment is mounted near the rearmost end of the wagon with respect to the intended direction of operative travel, but for some purposes, particularly where driver supervision is required, the equipment may be mounted near the front end. This applies in particular where the wagon is self-propelled.

The loading equipment is also secured to the sides of the wagon and the movements carried out and caused by the loading equipment are mainly performed in the direction of travel A.

The loading equipment includes a symmetrical portal structure, one only of the two sides of which will be described with reference to the side views of FIGS. 1 and 2 and to the plan view of FIG. 3.

At one end of the beam 7 a bell-crank coupling piece 16 is pivotally mounted, at its central point, on a shaft 17 journalled in the beam 7 and constituted, for example, by a hollow beam. The coupling piece 16 carries two pivotal shafts 18 and 19, one at each end. With the pivotal shaft 19 is connected the piston rod 20 of a hydraulic cylinder 21 which is pivotally connected to the beam 7 with the aid of a shaft 22. An arm 23 is rigidly connected with the coupling piece 16 and a hydraulic cylinder 24 is pivotally connected to the coupling piece 16 by means of the shaft 18. The ends of the arm 23 remote from the coupling piece 16 and of the piston rod 25 of the cylinder 24 are pivotally coupled with each other by supporting members 26, which are located on either side of the arm 23 and the piston rod 25. Between the supporting members 26 a lifting arm 27 is rigidly secured to these members 26. The ends of the lifting arms 27 on either side of the wagon are rigidly interconnected by a tube 28 that is enclosed, between the lifting arms 27, by an external tube 29 which is freely movable around the internal tube 28.

It should be noted that the zone bounded by the two arms 23, the lifting arms 27 and the external tube 29, constituting a portal structure and the rear end of the wagon itself (the transverse beam 8) is available for passing therethrough a loading platform, receptacle, container or the like and, moreover, for loading goods, material or the like onto the wagon.

At two zones located near the ends of the external tube 29 symmetrically to the plane of symmetry of the wagon, pick-up devices 30 are provided. Each pick-up device consists of two grippers 31, extending parallel to a vertical plane and forming together a pincer-like tool. Each gripper 31 is journalled by means of a shaft 32 in a bracket 33, fastened to the external tube 29, and extends in upward direction beyond its shaft 32, a shaft 34 being provided near the free end of each such prolongation. A hydraulic cylinder 35 is mounted between the shafts 34 of the two grippers 31 of the pick-up device 30.

Apart of the pick-up devices 30, hoisting rings 36 are secured to the external tube 29 at a number (for example three) positions. Each of these hoisting rings 36, one of which is preferably located in the plane of symmetry of the wagon, is intended for attaching other, preferably hydraulically controllable, tools. Each hoisting ring has its center line in horizontal position transverse of the direction of travel A.

The inlet and outlet pipes of the hydraulic cylinders 21, 24 and 35 and those of the tools to be attached to the hoisting rings 36 are passed along the structural parts of the loading equipment 15 and across the frame 1 to the front and connected with a fluid pump driven by the tractor 4. The fluid circuit includes a control-mechanism 37 mounted on the wagon (FIGS. 5, 6) for controlling the various hydraulic parts. In the case of a self-propelled wagon the fluid pump is, of course, driven by the engine of the wagon and the control-mechanism can then be disposed in the driver's cabin, particularly when the loading equipment is mounted near the front of the wagon.

One particular case of the loading equipment will now be described. FIG. 1 shows a manure spreader 38 standing on the ground behind the wagon. This spreader has a conveyor (for example, a rolling floor) 39 with a loading platform 40 (FIG. 2) having upright sidewalls 41 and a front wall 41A. At one end of the loading platform 40 a manure spreading member 42 is provided with a plurality of distributors 44 adapted to rotate about upright shafts 43. The distributors 44 and the conveyor 39 can be driven by means of driving shafts 45 extending on one side or on both sides of the loading platform 40 in the direction of movement of material along the conveyor. The driving shafts 45 are coupled by means of an auxiliary shaft 46 with the power take-off shaft of the tractor 4. On both sides of the manure spreader 38 an upwardly extending hoisting beam 47 is fastened and provided near its top end with a horizontal stub shaft 48, extending transversely of the direction of movement just mentioned. These hoisting beams 47 are located at the level of the point of gravity of the unloaded manure spreader when it is resting on the ground as illustrated in FIG. 1.

Figure 2:
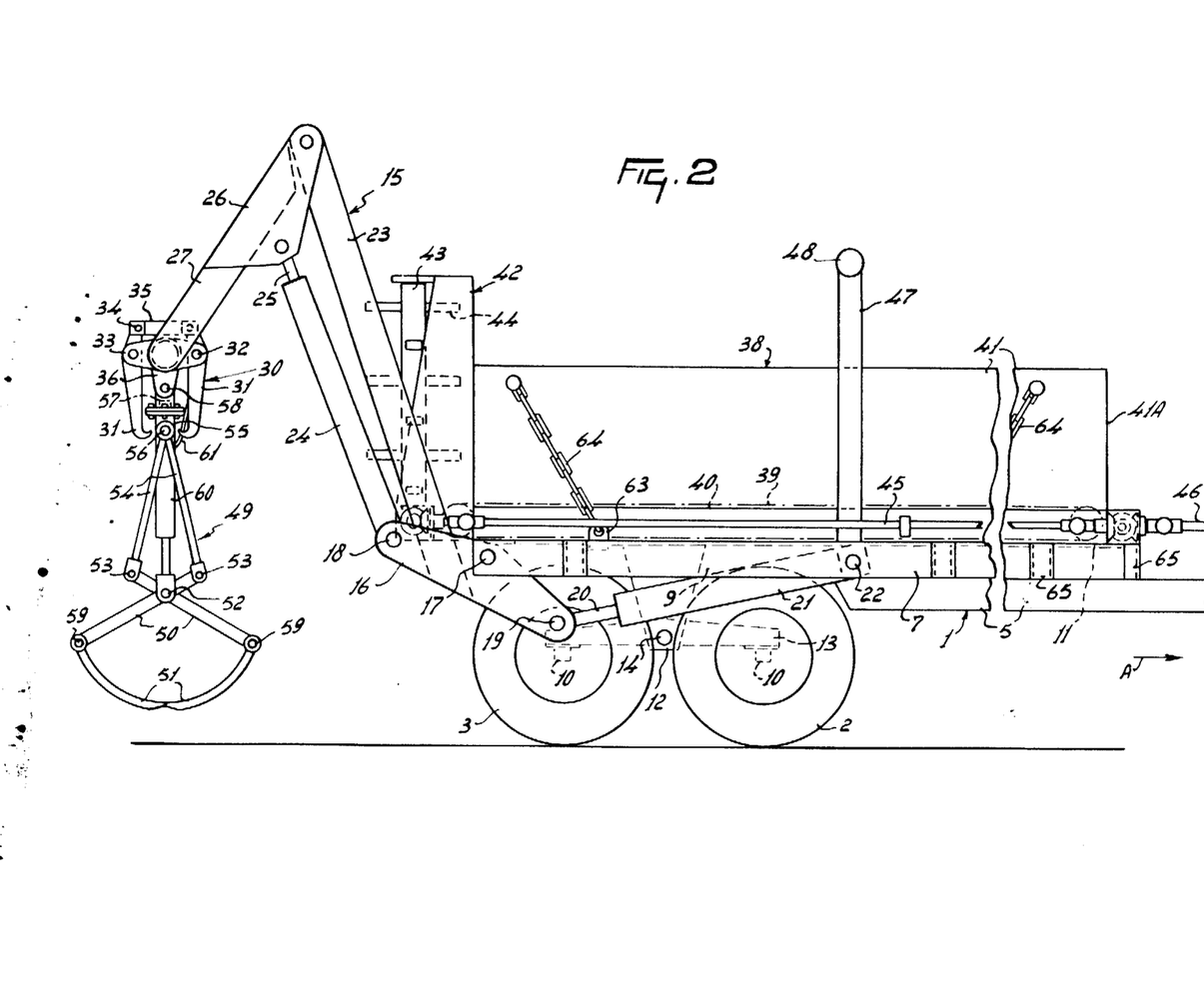
FIG. 2 is a side view showing the wagon with the manure spreader loaded thereon.
Figure 3:
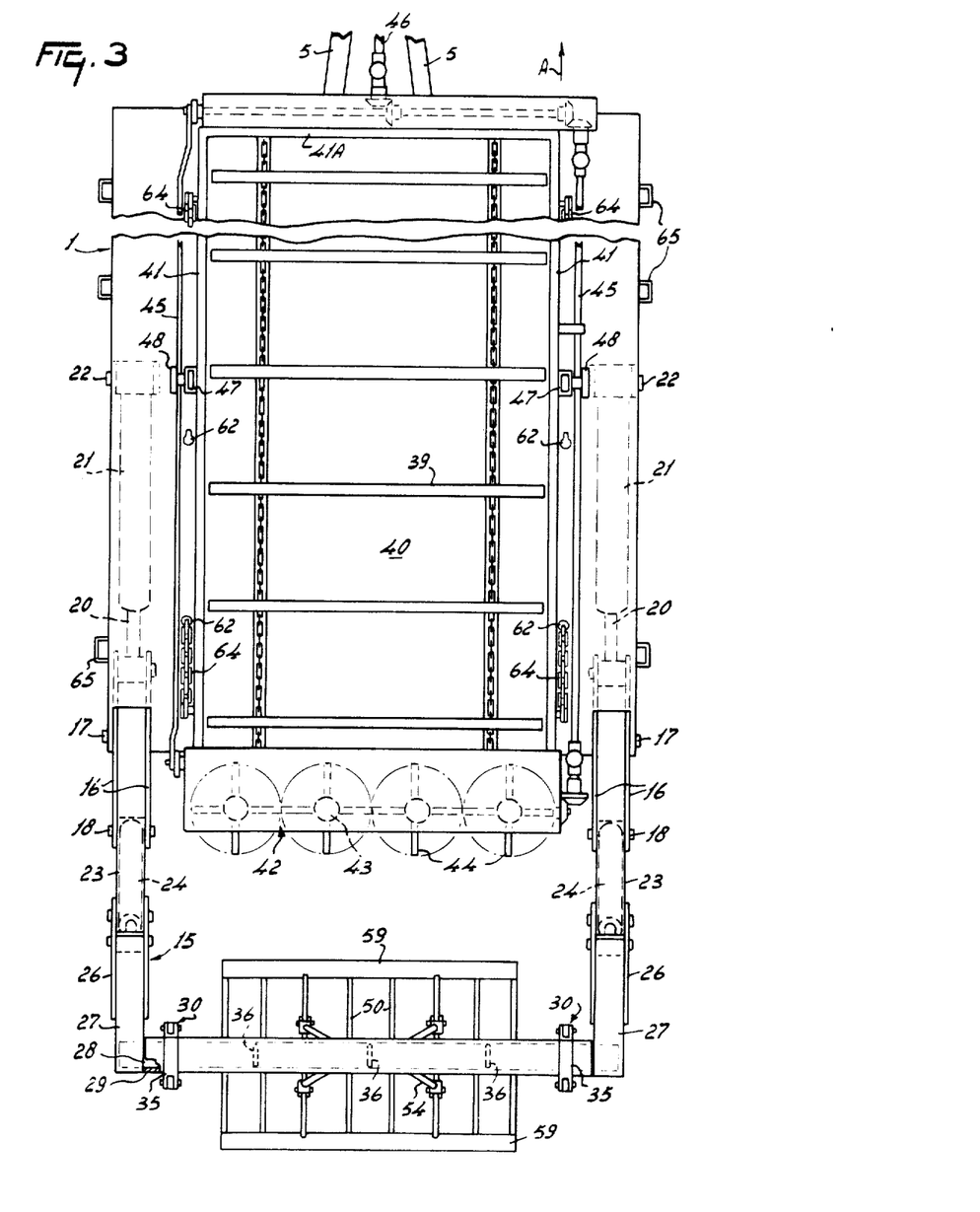
FIG. 3 is a plan view of the loaded wagon of FIG. 2.

FIG. 2 shows that the central hoisting ring 36 with a manure gripper 49 attached to it, the gripper 49 consisting of a plurality of shares 50, disposed in a row transversely of the direction of travel A and each provided with gripping arms 51. The shares 50 are in common pivotable about a shaft 52. Each share 50 is prolonged beyond its shaft 52 in the direction away from the gripping arm 51, the free ends of these prolongations of each associated pair of shares being pivotally connected by means of pivotal shafts 53 with a pair of arms 54, which are pivotally coupled, remote from the shafts 53, with a connecting piece 55 with the aid of a common shaft 56. The connecting piece 55 is provided with a flange which is releasably bolted to a flange of a coupling piece 57, consisting substantially of two parts, which is fastened to one of the hoisting rings 36 with the aid of a pin 58. The coupling piece 57 includes an upright pivotal shaft (not shown). The two parts of the coupling piece 57, located one beneath the other as viewed in FIG. 2, are relatively pivotable around this upright shaft.

The gripping arms 51 are rigidly secured to the shares 50 with the aid of coupling rods 59, extending transversely of the direction of travel A. On plan the manure pick-up extends over a distance at right angles to the direction of travel A amounting to about 70% of the distance between the arms 23 (FIG. 3). Between the shafts 52 and 56 a hydraulic cylinder 60 is pivotally coupled. The hydraulic inlet tubes 61 are secured to the cylinder 60 by means of a readily detachable coupling and are passed along the loading equipment and the loading platform towards the control-mechanism 37.

The mechanism shown in FIGS. 1, 2 and 3 operates as follows: The wagon with the loading equipment 15 is maneuvered in front of the empty manure spreader 38, standing on the ground, so that the longitudinal planes of symmetry of the wagon and the spreader substantially coincide. The loading equipment has mounted on it the two pick-up devices 30 and the manure gripper 49. By driving the wagon and/or by actuating the hydraulic cylinders 21 and 24 the pick-up devices 30 are moved to be above the stub shafts 48 of the hoisting beams 47. By actuating the cylinder 35 the grippers 31 are moved away from each other and disposed around the stub shafts 48. During this manipulation the manure gripper 49 is suspended between the upright sidewalls 41 above the loading platform 40. After the grippers 31 have been closed around the stub shafts 48, the whole manure spreader 38 can be lifted and placed and fixed on the wagon by actuating the hydraulic cylinders 21 and 24. For the latter manipulation the plate 11 has keyhole slots 62 (FIG. 3). The wide portion of each slot 62 allows the head of a T-shaped locking member 63 to pass through a chain 64 being secured to the upright limb of this locking member. After insertion the upright limb of the locking member 63 is drawn into the narrow portion of the slot 62 and the end of the chain 64 remote from the locking member 63 is secured to a sidewall 41. If desired a tensioning member (not shown) may be provided in the chain 64.

The chains 64 are attached near the four corners of the manure spreader 38, extending outwardly in upward direction to the spreader 38, so that the latter is fixed in place with respect to the wagon.

The wagon is then driven to a stock of manure. With the aid of the loading equipment 15 the loading platform 40 of the manure spreader 38, disposed on the wagon, can be loaded.

For this purpose the hydraulic cylinder 60 of the manure gripper 49 is actuated by the control-mechanism 37 for gripping a batch of manure. Then the loading platform 40 of the manure spreader 38 is loaded by moving the manure gripper 49 with the aid of the hydraulic cylinders 21 and 24 over the spreader 38, after which the gripping arms 51 are opened by actuating the cylinders 60. The dimensions are preferably such that the manure gripper 49 can be moved to near the front of the loading platform 40. The width of the manure gripper ensures a uniform distribution of the manure across the width of the loading platform 40 of the spreader 38.

After the driving shafts 45 have been coupled with the power take-off shaft 46 of the tractor, the rolling floor 39 may be used for distributing the manure in a desirable manner.

On the field the spreading members 44 and the rolling floor 39 are driven so that the manure is spread in known manner.

The manure spreader 38 can, of course, be removed from the wagon by means of the loading equipment 15 by carrying out the operations described in the reverse order.

The wagon provided with the loading equipment 15 may, of course, be employed for transporting different goods and materials. In a similar manner to that just described tree trunks may be loaded and unloaded by using the gripper 49 in a position differing, in plan, by 90° from the position shown in FIGS. 1 to 3, this position being shown in FIG. 4. This is rendered possible by the vertical pivotal shaft of the bipartite coupling piece 57. If desired each of the hoisting rings 36 may be provided with a tree gripper so that the loading capacity is multiplied. The trees are stacked on the plate 11. Holders 65 provided on the sides of the beams 7 can accommodate rings 65A for locking the loaded trunks in place. In a similar manner sacks and casings may be loaded.

Moreover, agricultural implements, for example, a plow, may be loaded on the wagon by means of the loading equipment 15 for transport to or from the fields.

Figure 5:
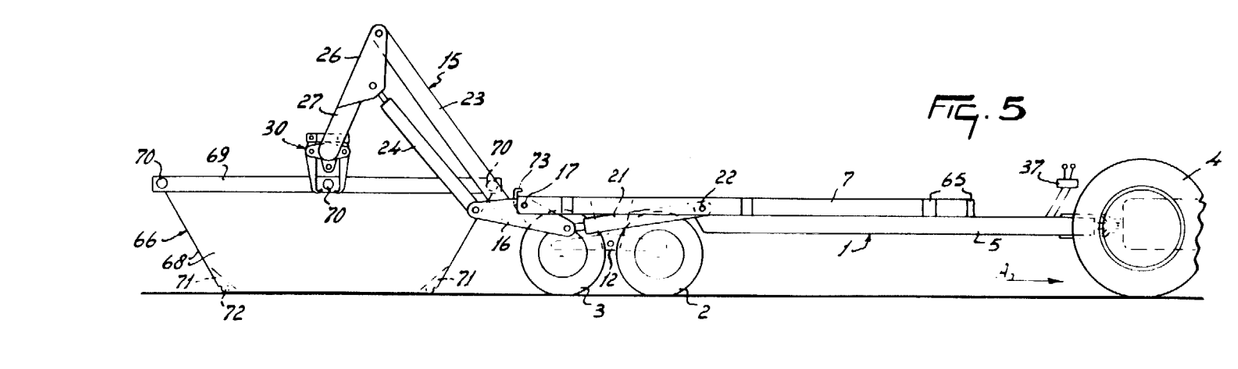
FIG. 5 is a side view of the wagon shown adjacent a container resting on the ground.
Figure 6:
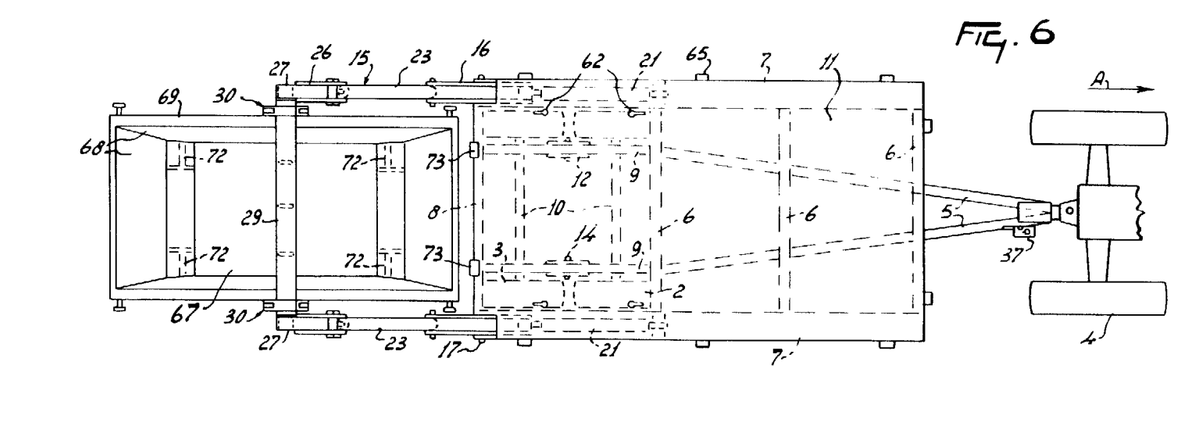
FIG. 6 is a plan view corresponding to FIG. 5.

FIG. 5 FIGS. 6 illustrate a different use of the wagon provided with the loading equipment 15, wherein containers 66 are loaded. Each such container has a bottom 67 and downwardly converging sidewalls 68 having at the top a rounded reinforced rim 69. Near the front and rear ends and at the center of the container stub shafts 70 are secured to the rim 69 so as to extend laterally therefrom horizontally and outwardly. At the junctions of the bottom 67 and the foremost and rearmost upright walls 68 cavities 71 are made in the bottom. These cavities accommodate cylindrical coupling members 72 so that the latter are located within prolongations of the walls 67 and 68. The container is gripped in the same manner as described above for the manure spreader at the central stub shafts by actuating the cylinder 35 with the grippers 31 of the pick-up devices 30 of the loading equipment. By actuating the hydraulic cylinders 21 and 24 the container is put on the plate 11 of the wagon and in the same manner as described above the limbs of the T-shaped locking members 63 are inserted into the wide portions of the recesses 62, after which the upright limbs are shifted into the narrow portions of the recesses 62 and the chains 64 are fastened, if desired by means of a tensioning member of the chains, to the stub shafts 70 of the container at the four corners of the container.

Figure 8:
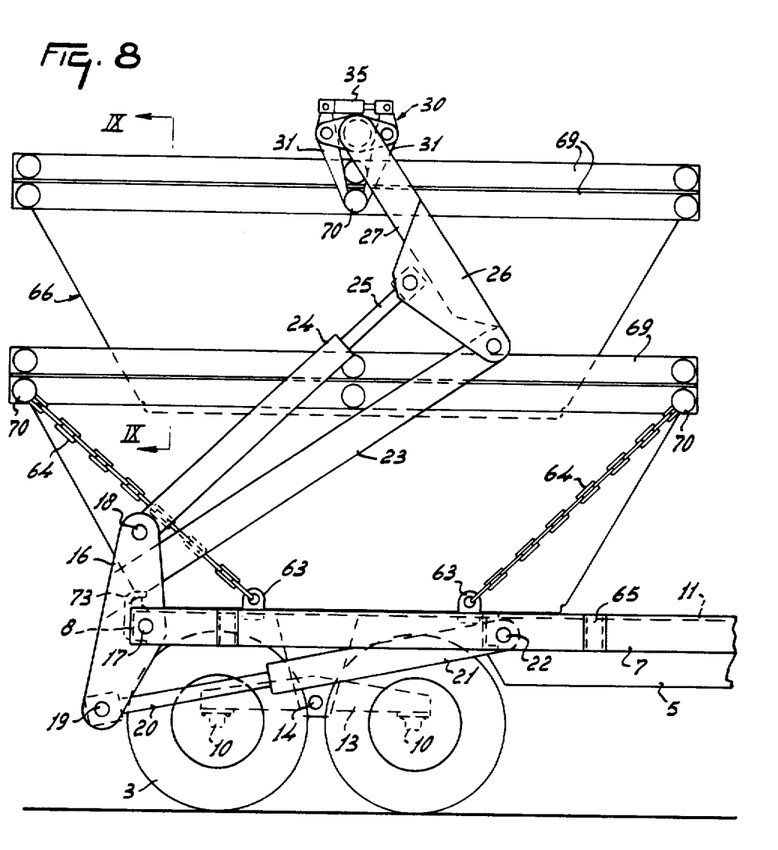
FIG. 8 is a side view showing how several containers can be loaded onto the wagon.

It will be appreciated that further containers 66 can be nested so that the bottoms 67 thereof are approximately parallel to each other. If the length of the grippers 31 is sufficient, several containers may be lifted simultaneously, loaded on the wagon and stacked on containers already loaded on the wagon as is shown in FIG. 8.

Figure 7:
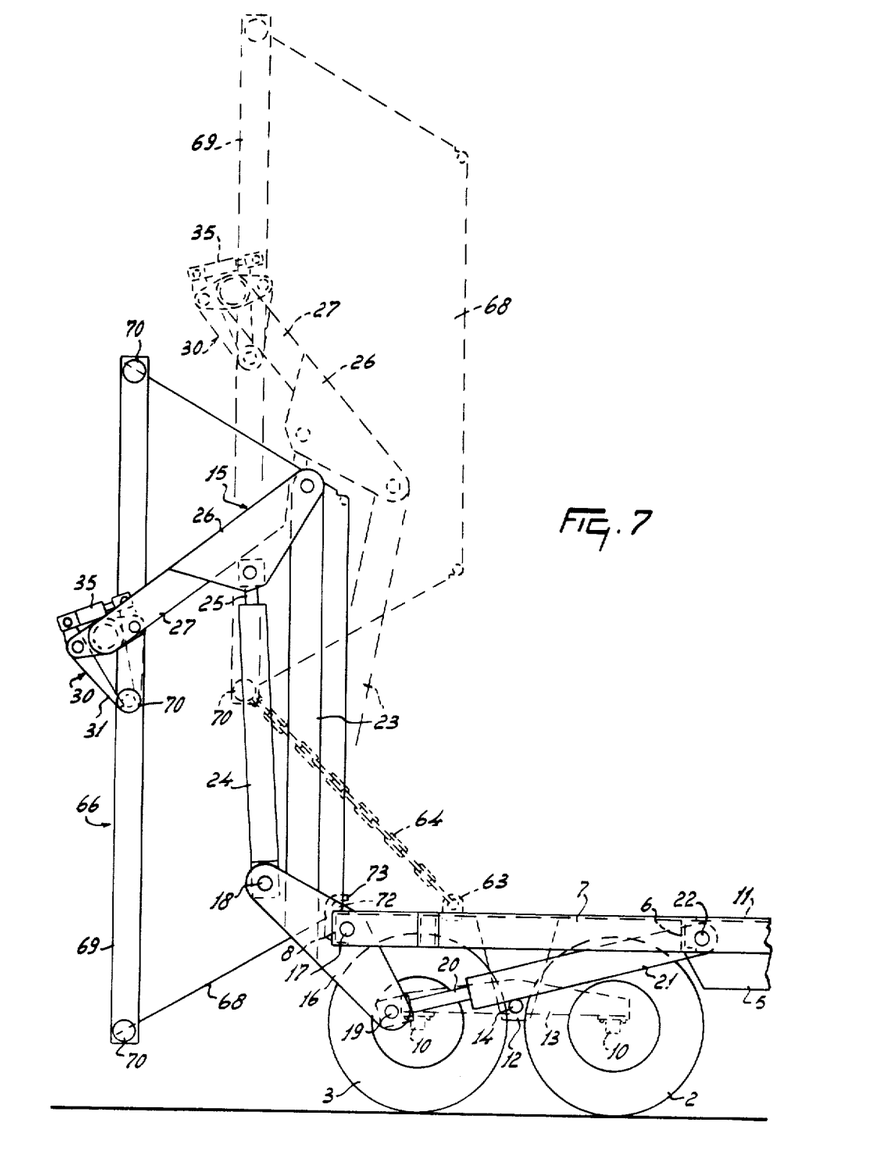
FIG. 7 is a side view illustrating the loading equipment engaged with the container and showing two potential tilted positions of the container.

FIG. 7 shows how a filled container loaded on the wagon can be emptied. The beam 8 has secured to it two L-shaped hooks 73 so that the distance between them is approximately equal to the distance between the coupling members 72 of a container, the short portions of the hooks extending horizontally to the front. When the container is lifted by the central stub shafts 70 and simultaneously moved opposite the direction of travel A by the loading equipment 15, the hooks 73 grip the container, which is tilted around the coupling members 72 so that the contents of the container can flow out. This low tilting position of the container is shown in FIG. 7 by solid lines.

If it is desired to empty the container from a higher tilted position, for example, in the case of a comparatively high-level trough, the chains 64, by which the rearmost stub shafts 70 are connected with the wagon during transport, are not removed. Only the two foremost chains are detached. The container is then slightly lifted forwardly by the loading equipment 15 so that the coupling members 72 of the container are set free of the hooks 73. When subsequently the container is lifted rearwardly, the rearmost stub shafts 70 are fixed in place by means of the chains 64 at a distance from the locking members 63 on the wagon. The container then tilts in the higher position shown by broken lines in FIG. 7.

A container mounted on the wagon by means of the loading equipment 15 can be filled with the aid of the same equipment 15.

Figures 4, 9:
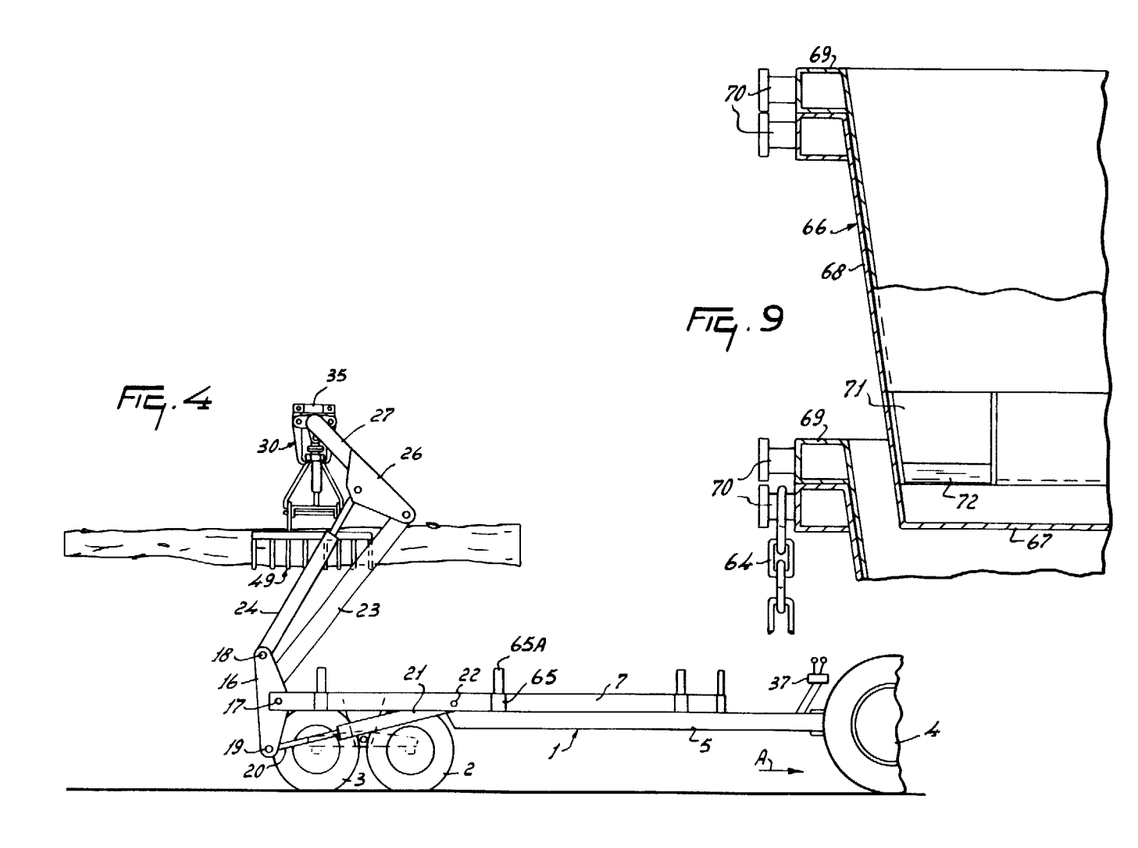
FIG. 4 is a side view of the wagon shown with its loading equipment including a gripper for loading trees.
FIG. 9 is a sectional view taken on the line IX—IX in FIG. 8, omitting the loading equipment of the wagon.

FIG. 9 is a sectional view of showing empty stacked containers, bearing on one another at their rims 69.

Figure 10:
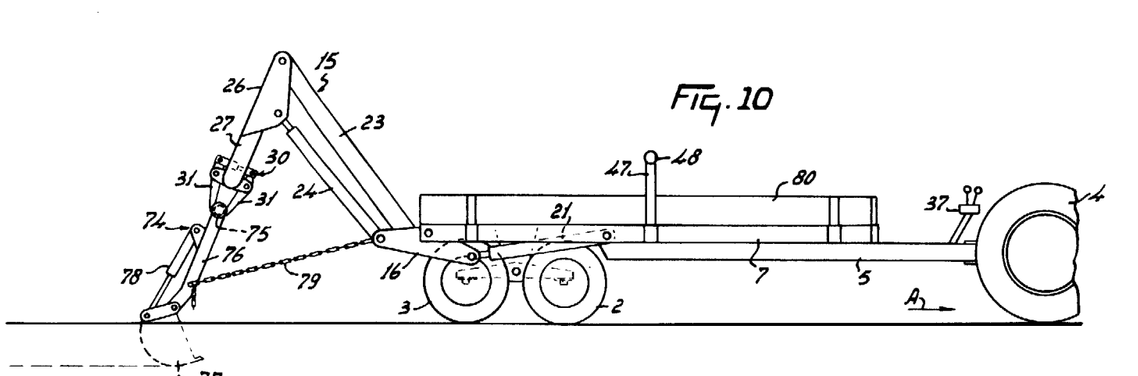
FIG. 10 is a side view showing the wagon with a trench digging implement attached thereto.

The wagon provided with the loading equipment may furthermore be employed for displacing earth, FIG. 10 showing the loading equipment coupled with a trench digging implement for digging ditches or trenches. The trench digging implement 74 is fastened at the center of a horizontal beam 75, extending transversely of the direction of operative travel A and pivotally connected with one or more of the hoisting rings 36. An arm 76 has pivotally coupled with it a bucket 77, their relative positions being determined by the position of an hydraulic cylinder 78. The cylinder 78 is hydraulically connected by means of a readily detachable coupling with the control-mechanism 37. A chain 79 extends between a point on the arm 76 located near the bucket 77 and a point on each of the coupling pieces 16. The wagon is shown provided with a receptacle 80 having beams 47 each provided with a stub shaft 48 as described above. The receptacle 80, provided or not provided with a conveyor, for example, a rolling floor, can be picked up by the loading equipment 15 engaging with the stub shaft 48 to be mounted on, or removed from, the wagon in the same manner as described above for the manure spreader 38 of FIGS. 1 to 3. The trench digging implement 74 may be connected with the loading equipment 15 during these operations, since in the position in which the grippers 31 embrace the stub shafts 48 the implement 74 may bear on the bottom of the receptacle 80, while the arm 76 extends more or less horizontally. The chain 79 is then detached or not detached in dependence upon the dimensions of the whole mechanism. By means of the implement 74 ditches, grooves and the like can be dug. The bucket 77 is pressed into the soil by the cylinders 21 and 24, while the wagon slowly moves onwardly. The soil-filled bucket 77 is moved over the receptacle 80 by swinging the arm 23 and by means of the cylinder 78 the bucket 77 is turned relatively to the arm 76 so that the soil drops into the receptacle.

Figure 11:
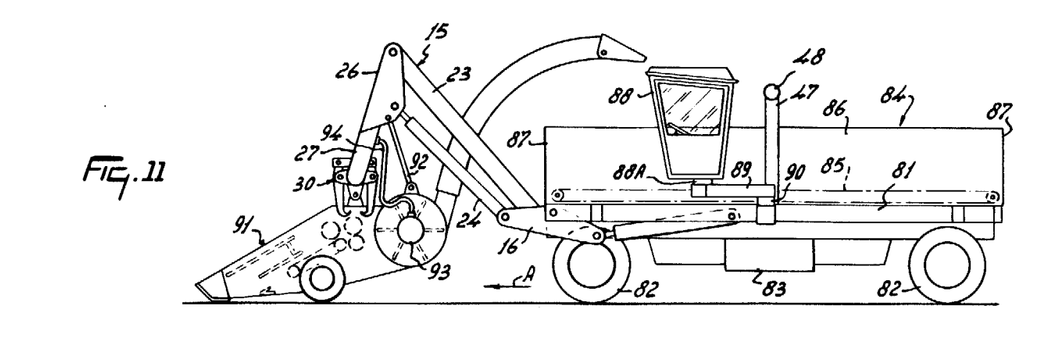
FIG. 11 is a side view of a self-propelled wagon having an agricultural implement attached thereto.

FIG. 11 shows the use of the equipment 15 for harvesting crops. In this case the wagon is self-propelled and includes a frame 81 supported from four wheels 82 mounted on two axles. The wheels 82 are steerable in known manner and all can be driven by an engine 83. A receptacle 84 including a conveyor 85, sidewalls 86 and front and rear walls 87 movable relatively to the sidewalls is detachably mounted on the frame 81. The wagon also has a driver's seat enclosed in a cabin 88. The driver's seat and the cabin 88 are adapted to turn through 360° about a shaft 88A mounted on an arm 89, and can be fixed in a plurality of positions. The arm 89 in turn is pivotable through 360° around a shaft 90 and can be fixed in a plurality of positions. The shaft 90 is journalled on one side of the frame 81, preferably at the center of one side of the wagon. The wagon can move in two directions at the same speed. In upward direction the arm 89 extends above the frame 81. By turning the driver's seat around the shafts 88A and 90 it can be moved and fixed in any desired position relative to the frame 81. The driver of the wagon can thus always occupy the most advantageous position for operation and driving, while a satisfactory supervision of the work is ensured under any condition.

Near one of the ends of the frame 81 the loading equipment 15 is arranged for putting several loading platforms, receptacles and the like on and off the wagon and by means of the same loading equipment 15 the loading platforms, receptacles or containers mounted on the wagon can be loaded; for example, the manure spreader 38, a device for loading trees and so on, as already described. A loading platform or the like mounted on the wagon can be fixed on the wagon with the aid of chains 64, also in the manner described above.

FIG. 11 shows a harvesting machine, in this case a forage harvester or chopper 91, attached to one or more hoisting rings 36. The forage harvester or chopper 91 is locked in position against turning about the internal tube 28 of the loading equipment 15 (FIGS. 1 and 2) by means of two detachable coupling rods 92 extending in inclined of two detachable coupling rods 92 extending in inclined positions upwardly inwardly with respect to the forage harvester. The length of the hoisting beams 47 is such that, when the receptacle 84 is coupled with the aid of the stub shafts 48 with the grippers 31 of the loading equipment 15, the forage harvester or chopper is located above the loading platform, in this case the conveyor 85. In this manner the forage harvester or chopper, or a different harvesting machine, can remain fastened to the loading equipment 15 during charging or discharging of the receptacle 84, while during road transport the forage harvester or chopper is located above the loading platform and hence above the wagon, a troublesome position in which the harvester or chopper is located in front of or behind the wagon being thus avoided.

The forage harvester or chopper is driven by means of an hydraulic motor 93 mounted on the shaft of the blower of the forage harvester. The further drivable parts of the forage harvester 91 are driven from the blower shaft.

The hydraulic motor is driven by means of hydraulic ducts 94 passed along the parts of the loading equipment from a fluid pump (not shown) coupled with the engine of the wagon and having an adequate output for this purpose. The hydraulic inlet and outlet ducts of the hydraulic motor 93 are provided, near the lifting arms 27, with readily detachable quick-releases.

In use the wagon with the receptacle 84 in position and with a forage harvester or chopper coupled with the loading equipment 15 and located above the loading platform is driven to the field. On the field the grippers 31 are opened by means of the cylinder 35 and the forage harvester or chopper is moved by the loading equipment into the operational position with the aid of the hydraulic cylinders 21 and 24, after which the coupling rods 92 are fixed in position and the hydraulic ducts 94 are linked near the lifting arms to the hydraulic system of the fluid pump (FIG. 11).

The forage harvester or chopper is then driven by the fluid pump of the wagon engine. The harvested crop is moved into the receptacle 84 in a conventional manner. By opening a front or rear wall 87 the crop is subsequently moved by means of the engine-driven conveyor from the receptacle 84 into a store. It is possible to ride on the road with a filled receptacle 84, the forage harvester or chopper being then located above the top level of the receptacle with the hoisting rings located high above the center of the receptacle.

It should be noted that in all the forms described above the loading platforms, receptacles, containers and the like and also the loading tools such as the manure gripper, the bracket, the harvester or chopper and so on are movable in the direction of travel of the wagon, these tools being displaceable through the zone formed at one end of the wagon by the portal structure of the loading equipment. As a matter of course, the loading equipment may be turned into a position at right angles to the direction of travel of the wagon, the loadability being then, however, less advantageous in the case of an elongated wagon, while additional supports may be required.

Although various features of the machines which have been described, and that are illustrated in the drawings, will be set forth in the following claims as inventive features, it is to be noted that the invention is not necessarily limited to these features and that it encompasses all of the features that have been described and illustrated both individually and in various combinations.

What we claim is:

1. A wagon comprising a wheeled frame with a loading surface, loading equipment pivotally coupled to said wagon near one end of said frame, and at least one loadable receptacle, said equipment comprising hydraulically operated arm means pivotally interconnected to each other and operated by hydraulic piston means at each side of said wagon, said arm means being connected to a pick-up structure having pick-up means and being lowerable and extendable to load, pick up and tilt said receptacle in at least two different positions with respect to said loading surface, said receptacle having spaced apart securing elements and coupling members for the alternative connection to connection means on said wagon, a first connection of said connection means being connectable to said coupling members, said receptacle being tiltable relative to said loading surface in a low position adjacent said surface, a second connection of said connection means being connectable to said elements and said receptacle being tiltable in a higher position in which said receptacle is positioned substantially above said loading surface, said receptacle being movable into said tilted positions with said arm means.

2. The wagon of claim 1, wherein said securing elements includes elements located at the ends of said container adjacent the upper portion thereof and said second connection comprises flexible means having an end attached to said wagon and an opposite end connected to said elements.

3. The wagon of claim 2, wherein said flexible means are chains.

4. The wagon of claim 3, wherein there are a plurality of containers that are configured to nest within one another on said loading surface and said chains are connectable to said elements to hold same in place.

5. The wagon of claim 1, wherein said first connection means comprises upwardly extending hooks at one end of said loading surface and the bottom of said container has bottom coupling members, whereby one end of the container is retained when said hooks engage said coupling members and the container is tilted in the low position.

6. A self-loading wagon comprising a wheeled frame with an upper loading area and loading equipment pivotally coupled at one end of said frame, said equipment comprising a hydraulically operated portal structure having arm means pivotally interconnected to each side of said frame and at least one hydraulic piston linked to one end of said arm means to raise and lower same, lifting arms articulated to the other end of said arm means with at least one further hydraulic piston interconnecting said arm means with said lifting arms to manipulate same with respect to said arm means, a support member bridging said lifting arms and said member having hydraulically controllable gripping elements attached to the member between the lifting arms, said lifting arms with gripping elements being lowerable and extendable to pick up an object and raise the object over the loading area and lower the object to rest on said area, the entire portal structure, including the arm means, lifting arms, support member and hydraulically controllable gripping elements being swingable from a position to the rear of said one end of the frame to a further position over and above said loading area, a bell crank piece at each side of said frame and said first mentioned hydraulic piston being pivotally connected near one end of each piece, said arm means being secured adjacent the other end of each piece, the bell crank pieces being pivotally mounted on shaft means at points between the connections of said hydraulic piston and said arm means.

7. The wagon of claim 6, wherein said further hydraulic piston pivotally interconnects each of the other ends of said bell crank pieces with the lifting arms.

8. The wagon of claim 6, wherein said support member comprises an external tube that is turnably mounted on an internal tube that is connected to said arms.

9. The wagon of claim 8, wherein said gripping elements comprise generally vertical grippers pivoted on a bracket that is attached to the external tube, a hydraulic member interconnecting the upper ends of said grippers to control the movements thereof.

10. The wagon of claim 9, wherein the object comprises a receptacle with hoisting means for engagement by said grippers.

11. The wagon of claim 10, wherein the receptacle is part of a manure spreader having upright hoisting beams for engagement by said grippers.

12. The wagon of claim 10, wherein said receptacle is part of a trench digger having upright hoisting beams for engagement by said grippers.

13. The wagon of claim 10, wherein said receptacle is part of a forage harvester or chopper having upright hoisting beams for engagement by said grippers.

* * * * *